Patented Feb. 14, 1950

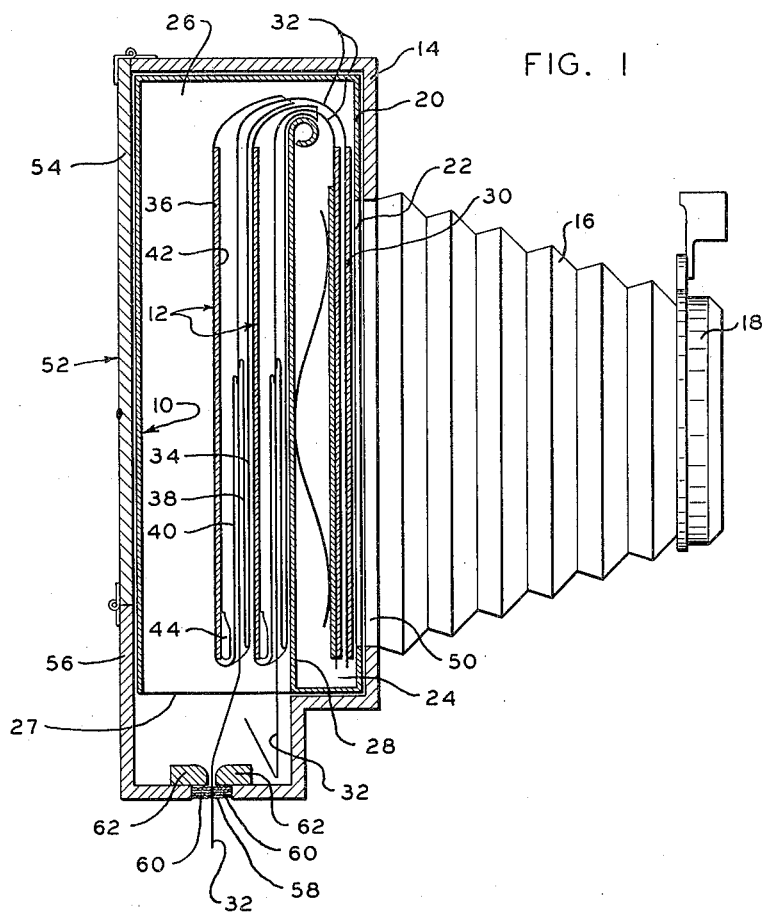

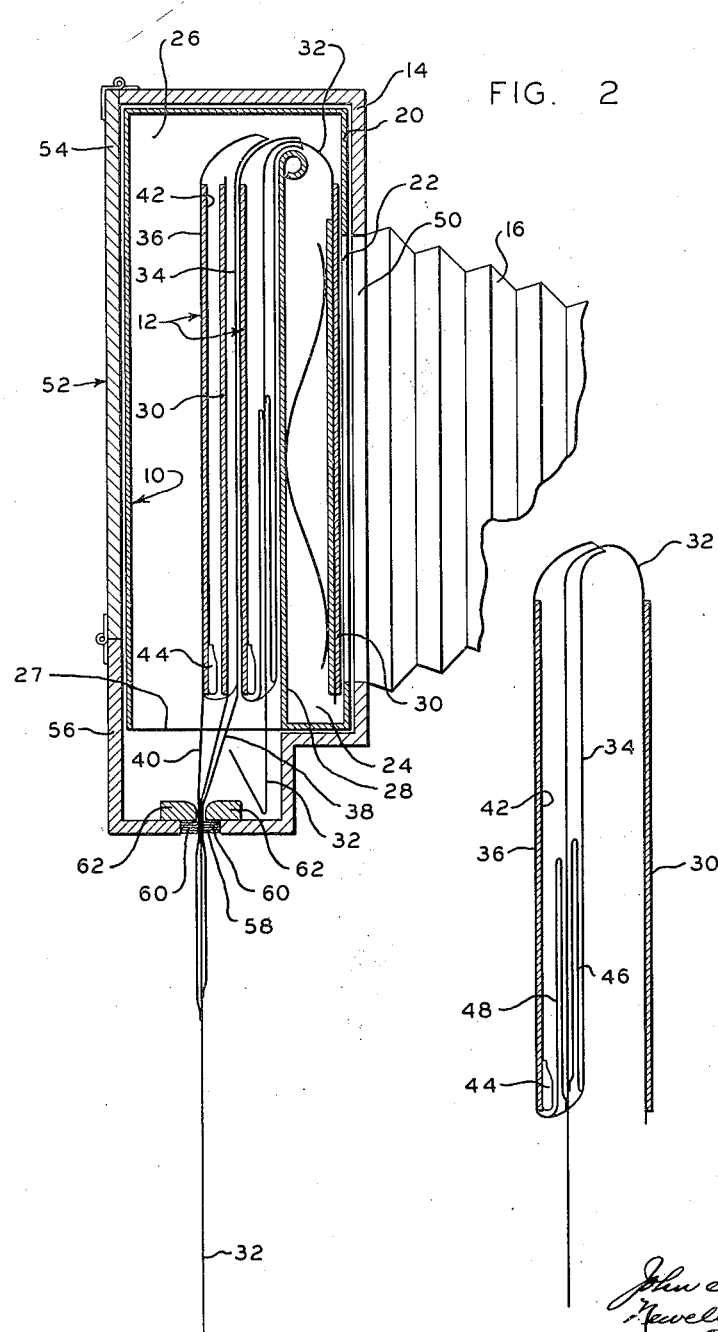

2,497,816

UNITED STATES PATENT OFFICE 2,497,816

PHOTOGRAPHIC PRODUCT

John Greenhalgh, Auburndale, Newell W. Pinkham, North Quincy, and Robert B. Tomer, Danvers, Mass., assignors to Polaroid Corporation, Cambridge, Mass., a corporation of Delaware Application July 16, 1947, Serial No. 761,240

7 Claims. (Cl. 95—22)

This application relates to photography and more particularly to novel photographic film assemblages and novel photographic products including such assemblages.

It has been proposed to process a layer of photosensitive material which has been differentially exposed to actinic light by spreading a liquid reagent between the surface of said photosensitive material and the surface of a second layer of material whereby the liquid reagent differentially reacts with the photosensitive material.

It is a principal object of the present invention to provide a novel photographic film assemblage having a sheet of photosensitive material arranged so that it can be differentially exposed to actinic light and which can be processed in the above-described manner.

It is another object of the present invention to provide a novel photographic film assemblage having a sheet of photosensitive material arranged so that a latent image can be formed therein and adapted after the formation of said latent image to be moved into a protecting environment whereby it is automatically registered with a second layer of material and which is then adapted to be processed by a simple mechanical treatment.

A further object of the present invention is to provide a novel photographic film assemblage having a sheet of photosensitive material arranged so that a latent image can be formed therein and which can as a result of a single continuous motion be drawn into a protecting environment in registry with another layer of material and a supply of liquid reagent and subjected to a simple mechanical treatment to process said photosensitive material.

Another object of the present invention is to provide a novel photographic product comprising a magazine containing a film assemblage of the above type having improved means for automatically obtaining registry of the two layers of material and the supply of liquid reagent before the assemblage is moved out of said magazine for processing.

Another object of the present invention is to provide a novel photographic product comprising a magazine containing a film assemblage of the above type having improved means for moving the photosensitive layer from exposure position in said magazine into registry with the other layer of material in the protective environment and then moving the entire film assemblage out of said magazine as one continuous operation.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a sectional view illustrating diagrammatically the magazine and photographic film assemblages of the present invention positioned in a camera adapted to expose and process said photographic assemblages;

Fig. 2 is a view similar to Fig. 1 but showing one of the photographic film assemblages after the photosensitive layer has been drawn into the opaque envelope but before said assemblage has been drawn from the magazine; and Fig. 3 is a diagrammatic sectional view illustrating a modification of the photographic film assemblage.

To practice the above-described method of processing a photographic film assemblage it is desirable that a certain predetermined sequence of events take place. For example, it is desirable that the layer of photosensitive material be located in the focal plane of a camera or other photographic apparatus with no opaque material between it and the lens and shutter of the camera or the equivalent exposure means in other photographic equipment. The photosensitive layer is then exposed to actinic light to form therein a latent negative image. Following the formation of the latent negative image in the photosensitive layer it is then desirable to bring a second layer of material into face-to-face relation with the photosensitive layer. Next, it is desirable to deposit a predetermined quantity of a liquid reagent between the interface surfaces of the photosensitive layer and the other layer of material adjacent to and substantially along one edge of the latent negative image and then to spread the liquid reagent in a uniform layer of predetermined thickness between the two interface surfaces preferably by drawing the two sheets of material through a pressure-applying means as, for example, a pair of rollers or a pair of barlike members spaced apart a predetermined distance.

The present invention comprises a novel photographic film assemblage having a layer of photosensitive material which is adapted to be exposed to actinic light to have formed therein a latent negative image. An envelope opaque to light which is actinic to said photosensitive layer carries another layer of material and a predetermined quantity of liquid reagent. A leader associated with said photosensitive layer is adapted to pull said photosensitive material into said opaque envelope in registry with said other layer of material and said supply of liquid reagent and to draw the photographic film assemblage through a means for applying a mechanical stress to the assemblage to spread the liquid reagent between the interface surfaces of said photosensitive layer and said other layer to cause the above-described reaction to take place.

The novel photographic film assemblage of the present invention is particularly adapted to be mounted in groups of two or more in a magazine to provide a multiple exposure film pack.

A preferred embodiment of the present invention is illustrated diagrammatically in Figs. 1 and 2 of the drawings herein a magazine 10 containing a plurality of photographic film assemblages 12 is shown in the back 14 of a camera having a conventional bellows 16 and lens and shutter assembly 18. The magazine 10 comprises a generally rectangular container formed from any suitable material as, for example, steel, and has a front wall 20 which has an exposure opening 22 formed therein. The magazine 10 is divided into a front compartment 24 and a back compartment 26 by means of a wall or partition 28 which extends upwardly from the bottom wall of the magazine. The bottom of the back compartment 26 is open to provide a withdrawal opening 27. A plurality of photographic film assemblages 12, each substantially similar to one another, are carried by the magazine 10.

One element of each of the photographic film assemblages 12 comprises a layer of photosensitive material 30 which is positioned in the front compartment 24 of the magazine 10 with a predetermined area thereof, which is adapted to have a latent negative image formed therein, located in back of the exposure opening 22. Each of said photosensitive layers 30 is preferably attached to and carried by a leader 32. The layer of photosensitive material may comprise a layer of any photosensitive material as, for example, silver halide carried by a base layer of any suitable material as, for example, paper, cellulose acetate or cellulose nitrate. Preferably, the length and width of the layer of photosensitive material and its supporting base layer are at least such that they completely cover the exposure opening 22 in the front wall of the magazine 10. The leader 32 may be formed from any flexible sheet material, but it is preferably made from a black tab stock. It will be understood that the photosensitive layer and leader may be formed as a single unit, i. e., by employing a photosensitive layer of sufficient length so that a major portion of it can serve as a leader instead of attaching a smaller sheet of photosensitive material to a sheet of less expensive material.

An opaque envelope preferably made from a material which is opaque to light actinic to said photosensitive layer 30 as, for example, a black tab stock similar to that used to form the leader 32, is located in the back compartment 26 of the magazine 10. The envelope is wider and longer than the photosensitive layer 30 and comprises a front wall 34 and a back wall 36 which are attached to each other along each side and which are not attached to each other along their top and bottom edges. The front wall 34 is shorter than the back wall 36 so that the lower edge of the front wall 34 is positioned above the lower edge of the back wall 36. The lower edge of front wall 34 is provided with an extension or flap 38 and the back wall 36 is provided with an extension or flap 40. Flaps 38 and 40 are both of substantially the same predetermined length and this predetermined length of flaps 38 and 40 will subsequently be explained in detail.

The leader 32 extends from the front compartment 24 over the partition 28 into the back compartment 26 and between the walls 34 and 36 of the opaque envelope. The leader 32 passes completely through the envelope and emerges from its lower end. The extensions or flaps 38 and 40 are folded upwardly along the bottom edges of their respective walls into the envelope along each side of the leader 32 and are attached at their ends to opposite surfaces of the leader 32. It will thus be seen that by grasping the leader 32 as it emerges from the bottom of the envelope and pulling on said leader 32, the photosensitive layer 30 will be drawn into said envelope until such time as the extensions or flaps 38 and 40 have been drawn from said envelope and completely extended at which time they will cause the photosensitive layer and the envelope to move as a unit upon continued movement of the leader 32.

A second layer of material 42 is carried by the inner surface of the back wall 36 of the envelope. The layer of material 42 may comprise any flexible material as, for example, paper, cloth, thin wood, metal, plastic or the material known to the art as baryta paper. A predetermined area, adapted to receive a visible image of the latent image formed in the layer of photosensitive material 30, is located on the exposed surface of the second layer of material 42. A supply of liquid reagent is contained in a liquid-carrying container 44 which is located on and adhesively carried by the second layer of material 42. The liquid-carrying container 44 is positioned on said second layer of material 42 adjacent and parallel to the lower edge of said image-receiving area but spaced a slight distance from said lower edge.

Preferably, the liquid-carrying container 44 is an envelope or saclike structure formed by folding a multilayer sheet of material upon itself and sealing the three edges thereof to form a liquid-carrying container which is impervious to the contained liquid and which is also impervious to oxygen and water vapor. The liquid-carrying container 44 thus formed is adapted, upon the application of a mechanical stress thereto, to break open along its longitudinal sealed edge and release its contained liquid. The multilayer sheet from which the liquid-carrying container 44 is formed preferably comprises a base layer of kraft paper or fabric, an intermediate layer of metal foil such as a sheet of lead foil laminated to the base layer, and a third layer of heat-sealing plastic substantially impervious and inert to the liquid to be enclosed.

The extensions or flaps 38 and 40 serve a dual function. First, they act as registering means to align the image area on the photosensitive layer 30 with the image-receiving area on the second layer of material 42 when said photosensitive layer 30 is drawn into the envelope by means of the leader 32. The second function is to cause the entire assemblage to move as a unit upon continued movement of the leader 32 after the extensions or flaps have been completely extended outside the envelope. Thus, the extensions or flaps 38 and 40 permit the photosensitive layer 30 to be drawn by means of leader 32 from exposure position into the opaque envelope until the two image areas are registered, following which continued movement of leader 32 causes the complete photographic film assemblage to move as a unit. It will therefore be seen that one continuous movement of leader 32 will move the photosensitive layer 30 and the other layer 42 into face-to-face relation and draw the complete photographic film unit from the magazine 10, and if desired through a processing means adapted to burst the liquid-carrying container 44 and spread the contained liquid between the interface surfaces of said photosensitive layer 30 and said other layer 42 to bring about the above-described reactions.

To permit the extensions or flaps 38 and 40 to function in this manner their length should be such that they will be completely withdrawn from the opaque envelope and extended in the manner illustrated in Fig. 2, when the two image areas are in registry with each other. Therefore, the lengths of the extensions or flaps 38 and 40 should be substantially one-half the distance from the lower edge of the image-receiving area on the layer 42 to the upper edge of the image area on the layer of photosensitive material 30, the distance being measured along the leader 32 extending between said two edges.

As previously stated, the lower edge of the front wall 34 of the envelope is preferably located above the lower edge of the back wall 36. As a result of this stagger in the lower edges of the envelope, the locations at which the ends of the flaps 38 and 40 are attached to the leader 32 are staggered with respect to each other by a similar distance. This last-mentioned stagger prevents the assemblage from being unduly thick at the points where the extensions or flaps 38 and 40 are attached to the leader 32. The last-mentioned stagger also prevents the assemblage from being expanded unduly by the folds which occur in the extensions or flaps 38 and 40 as they are pulled out of the envelope by causing said folds to be staggered.

The layers of photosensitive material 30 located in the front compartment 24 of the magazine 10 are protected from actinic light by means of a dark slide or safety layer, not shown, until such time as the magazine 10 is inserted in the back 14 of the camera. This dark slide may be formed from any opaque flexible sheet material, but it is preferably made of a black tab stock similar to that used to make the leader 32. It comprises a strip of material of sufficient width to cover the exposure opening 22 and of sufficient length to extend from in back of said opening 22 over partition 28 and out of the magazine 10 through the withdrawal opening 21 at the bottom of the back compartment 26.

In one satisfactory form of the invention the total thickness of the layer of photosensitive material and its supporting base layer is substantially .0065 inch, the thickness of the black tab stock employed to form the leader 32 and walls 34 and 36 of the opaque envelope is substantially .003 inch, the thickness of the second layer of material 42 is substantially .0065 inch, and the lower edge of the front wall 34 of the envelope is located substantially one-quarter inch above the lower edge of the back wall 36.

If the photosensitive material 30 comprises a diazonium photosensitive material the liquid carried by the liquid-carrying container 44 can be such that it will develop a visible positive image in said material 30. If the photosensitive material 30 comprises a standard silver halide photosensitive material the liquid reagent may develop a negative image therein and it may also fix the negative image. In a preferred form of the invention the liquid also creates a positive image of the latent negative image on the surface of a second sheet of material. If such a positive image is desired a liquid composition is preferably formed as set forth in the following nonlimiting example:

*Example*

| | Grams |
|---|---|
| Water | 1860 |
| Sodium carboxymethyl cellulose | 93 |
| Sodium sulfite | 78 |
| Sodium hydroxide | 74.6 |
| Sodium thiosulfate | 14.5 |
| Citric acid | 38.5 |
| Hydroquinone | 52.0 |

The embodiment of Fig. 3 comprises a photographic film assemblage having a photosensitive layer 30, a leader 32, a second layer of material 42, an envelope comprising a front wall 34, a back wall 36, and a liquid-carrying container 44, all similar to the embodiment disclosed in Figs. 1 and 2. The front wall 34 is provided with an extension or flap 46 and the back wall 36 is provided with an extension or flap 48. The extensions 46 and 48 are substantially twice the length of extensions or flaps 38 and 40 of the embodiment disclosed in Figs. 1 and 2, and are folded at substantially their mid-points and are also folded upwardly along the bottom edges of their respective walls into the envelope in a fanfold along each side of the leader 32. The ends of said extensions or flaps 46 and 48 are attached at their ends to opposite surfaces of the leader 32 at substantially the same level as the bottom edge of their respective walls. The embodiment of Fig. 3 functions in the same manner as the embodiment disclosed in Figs. 1 and 2.

The apparatus of Figs. 1 and 2 comprises a camera having a conventional bellows 16 and lens and shutter assembly 18 which are attached to camera back 14 having exposure aperture 50 formed therein. A jointed cover 52, comprising an upper section 54 hingedly mounted on the camera back 14 at the upper edge thereof and a lower section 56 hingedly mounted on the lower edge of the upper section, completely covers the back of the camera back 14. A slot 58 having a light seal 60 therein is provided at the bottom of the camera back 14 between said camera back 14 and the lower section 56 of the jointed cover 52. A pair of spaced pressure-applying members 62 are located inside of the camera back 14 adjacent to and on each side of the slot 58. The pressure-applying members 62 disclosed in Figs. 1 and 2 comprise a pair of rigid bars that are held a predetermined distance apart against movement toward or away from each other when the jointed cover 52 is in the operative position disclosed in Figs. 1 and 2. However, the pressure-applying members may comprise a pair of rollers rotatably mounted a predetermined distance apart against movement toward or away from each other, or a pair of bars or rollers that are urged toward each other by means of spring loading.

To use one of the magazines loaded with the novel photographic film assemblages of the present invention in the apparatus disclosed in Figs. 1 and 2, the jointed cover 52 is opened and one of the magazines is placed in the camera back 14 with its exposure opening 22 in alignment with the exposure aperture 50 and the jointed cover 52 is closed. Leaders 32 are folded, as illustrated in Figs. 1 and 2, so that they do not extend out of the camera back. The end of the dark slide or safety layer is not folded and it extends out of the camera through the slot 58. The dark slide or safety layer is then drawn out of the magazine and camera to uncover the photosensitive layer 30 which is in back of the exposure opening 22. The lower section 56 of the jointed cover 52 is then opened and the leader 32 of the rear film assemblage is unfolded so that it extends out of the camera back 14 and the lower section 56 is again closed to re-form the slot 58 with the leader 32 between the pressure-applying members 62 and extending out of the camera back through the slot 58. After the shutter mechanism 18 has been actuated to form a latent negative image in the photosensitive layer 30, the leader 32 is grasped and pulled to draw said photosensitive layer 30 into the opaque envelope and then to draw the opaque envelope and the contained layer of photosensitive material 30, second layer of material 42 and liquid-carrying container 44 through the pressure-applying members 62.

The distance between the pressure-applying members 62 exceeds the total thickness of the walls 34 and 36 of the envelope, the photosensitive layer 30 and the second sheet of material 42 by a distance at least equal to two thicknesses of the multilayer sheet material from which the liquid-carrying container is formed but the distance between said pressure-applying members 62 does not exceed the above-mentioned total thickness by a distance equal to the thickness of the liquid-carrying container 44. Therefore, the act of drawing the composite photographic film unit between the pressure-applying members 62 causes said pressure-applying members 62 to exert a pressure on the liquid-carrying container 44, which pressure, in turn, causes said container 44 to rupture and discharge its contained liquid between the interface surfaces of the photosensitive layer 30 and the second layer of material 42. Continued movement of the film assemblage between the pressure-applying members 62 causes them to spread the released liquid between said interface surfaces in a layer of substantially uniform thickness to cause the above-mentioned reactions to take place. After a sufficient length of time has elapsed after the photographic film assemblage is drawn between the pressure-applying means 62 for the desired reaction to take place, the envelope is torn apart and the layer of material 42 is peeled from the layer of photosensitive material 30 to give on the layer 42 a visible positive image of the latent negative image which was formed in the layer 30.

The thickness of the layer of liquid which is deposited between the interface surfaces of the layer of photosensitive material 30 and the second sheet of material 42 may be controlled by placing a sheet of flexible material as, for example, paper or cardboard between the back wall 36 and the second sheet of material 42 to decrease the distance between the interface surfaces of said layer of photosensitive material 30 and said second layer of material 42.

Whereas the use of the novel photographic film assemblage and photographic product including such assemblages of the present invention has been disclosed in connection with a specific form of camera adapted to process said film assemblage as it is being drawn therefrom, it will be understood that the novel photographic film assemblage may be removed from the photographic apparatus and processed at some remote time or place by being passed through a pressure-applying means.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A film pack comprising a magazine and at least one composite photographic film assemblage therein; said photographic film assemblage comprising a layer of a silver halide photosensitive material, a second layer of material, said photosensitive layer having a predetermined area thereon adapted to have a latent image formed therein and adapted for movement relative to said second layer so as to permit alignment of said area on said photosensitive layer with a corresponding area of said second layer, an envelope formed from a material opaque to light which is actinic to said photosensitive layer, said second layer of material being disposed in said envelope and carried by one of the walls thereof and having said predetermined area thereon adapted to receive a visible image, said envelope having an opening at one end at least as wide as said layer of photosensitive material, a leader associated with said photosensitive layer and extending from said photosensitive layer through said opening and into said envelope, a flap associated with each wall of said envelope at the other end thereof, each of said flaps being normally disposed in said envelope and having their ends attached to opposite sides of said leader, said flaps being adapted to register the image area on said photosensitive layer with the image-receiving area on the second layer of material when said photosensitive layer is drawn into said envelope through said opening by means of said leader, and a container releasably carrying a liquid composition secured to one of said layers adjacent an edge of its associated predetermined area, said liquid comprising at least a solvent for a silver halide developer and said assemblage including said developer and a substance for forming a visible image on said second layer; said magazine including a housing within which at least said photosensitive layer may be held and positioned in exposure position outside of said envelope, and means defining an exposure opening in said housing permitting exposure of the photosensitive layer held thereby.

2. A composite film pack comprising a magazine and at least one composite photographic film assemblage therein; said photographic film assemblage comprising a layer of a silver halide photosensitive material having a predetermined area thereon adapted to have a latent image formed therein, an envelope having a front wall and a back wall formed from a material opaque to light which is actinic to said photosensitive layer, a second layer of material disposed in said envelope and carried by one of the walls thereof and having a predetermined area thereon adapted to receive a visible image, said photosensitive layer being adapted for movement relative to and for movement with said second layer of material to process said photosensitive layer, said envelope having an opening at one end thereof at least as wide as said photosensitive layer, a leader associated with said photosensitive layer and extending from said photosensitive layer into said envelope through said opening, the lower edge of said front wall being located above the lower edge of said rear wall, a flap associated with the lower edge of said front wall, a second flap associated with the lower edge of said back wall, both of said flaps being normally disposed inside of said envelope adjacent to said leader and having their ends attached to said leader, the length of said flaps being equal and of a predetermined length which permits said leader to draw said photosensitive layer into said envelope through said opening to bring its image area in registry with the image-receiving area on said second sheet of material, and a container releasably carrying a liquid composition secured to one of said layers adjacent an edge of its associated predetermined area, said liquid comprising at least a solvent for a silver halide developer and said assemblage including said developer and a substance for forming a visible image on said second layer; said magazine including a housing within which said photosensitive layer may be held and positioned in exposure position outside of said envelope, portions of said housing defining an exposure opening permitting exposure of the photosensitive layer held thereby, and means removably assoicated with said exposure opening for preventing passage of light through said exposure opening.

3. A photographic product comprising a housing having a front compartment and a back compartment, an exposure opening in said front compartment, a film withdrawal opening in the bottom of said back compartment, a photographic film assemblage in said housing comprising a layer of photosensitive material in said front compartment, an envelope opaque to light which is actinic to said photosensitive layer in said back compartment, an opening in the top of said envelope, a second layer of material disposed in said envelope, a leader associated with said photosensitive layer adjacent the upper edge thereof, said leader extending from said front compartment to said back compartment, into said envelope through the opening therein, past said second layer of material, out the bottom of said envelope and out of said housing through said withdrawal opening, a liquid-carrying container mounted in said envelope between said second layer of material and said leader, a liquid composition in said container, said liquid comprising at least a solvent for a silver halide developer and said assemblage including said developer, and a flap disposed in the bottom of said envelope and having one of its ends secured to the bottom of said envelope and its other end secured to said leader, said flap being sufficiently long to permit said leader to draw said photosensitive layer from said front compartment into said envelope and into face-to-face relation with said second sheet of material and said flap being sufficiently short to thereafter move said envelope, said second layer of material and said photosensitive layer from said housing as a unit.

4. A photographic product comprising a housing having a front compartment and a back compartment, an exposure opening in said front compartment, a film withdrawal opening in the bottom of said back compartment, a composite photographic film assemblage in said housing comprising a layer of photosensitive material in said front compartment, said photosensitive layer having a predetermined area thereon in alignment with said exposure opening and adapted to have a latent image formed therein, an envelope opaque to light which is actinic to said photosensitive layer in said back compartment, an opening in the top of said envelope, said opening being at least as wide as said photosensitive layer, a second layer of material disposed in said envelope, a predetermined area on said second layer of material adapted to receive a visible image thereon, a liquid-carrying container mounted on said second sheet of material adjacent one edge of the image-receiving area thereon, a liquid composition in said container, said liquid comprising a solution of a developer for silver halide and a silver halide solvent, a leader associated with said photosensitive layer, said leader extending from said front compartment to said back compartment, into said envelope through the opening therein, past said second layer of material and the liquid-carrying container mounted thereon, out the bottom of said envelope and out of said housing through said withdrawal opening, and two flaps disposed in the bottom of said envelope, said flaps being separated from each other by said leader, each of said flaps having a length at least one-half the length of leader extending from said photosensitive material to said liquid-carrying container, one end of each of said flaps being secured to the bottom of said envelope and the other end of each of said flaps being secured to said leader whereby said leader can draw said photosensitive layer from said front compartment into said envelope with said image area on said photosensitive layer in superposed relation to said image-receiving area on said second layer of material and said flaps being sufficiently short to thereafter move said envelope, said second layer of material and said photosensitive layer from said housing as a unit.

5. A film pack comprising a magazine and at least one composite photographic film assemblage therein; said composite photographic film assemblage comprising a layer of photographic photosensitive material, an envelope formed from a material opaque to light which is actinic to said photosensitive layer, said photosensitive layer being normally positioned outside of said envelope, said envelope having an opening at both ends thereof, a leader connected to said photosensitive layer and extending into said envelope through one of said openings and extending out of said envelope through the other of said openings, and a connecting member secured both to said leader and to said envelope, said connecting member being sufficiently long to permit said leader to draw said photosensitive layer completely into said envelope through said first opening and being sufficiently short to thereafter move said envelope with said photosensitive layer; said magazine including a housing within which at least said photosensitive layer may be held and positioned in exposure position outside of said envelope, and means defining an exposure opening in said housing permitting exposure of the photosensitive layer held thereby.

6. A photographic film assemblage comprising a layer of a developable photosensitive material, an envelope formed from material opaque to light which is actinic to said photosensitive layer, said envelope having a first opening at one end thereof, a leader secured to said photosensitive layer and extending into said envelope through said opening, said leader extending along the length of said envelope and out of said envelope through a second opening at the other end of said envelope, a flap secured to said envelope adjacent said second opening, said flap being secured to said leader and being sufficiently long to permit said leader to draw said photosensitive layer into said envelope through said opening, and a container carried by said envelope in position to be adjacent an edge of an exposed area of said photosensitive layer when said layer is drawn into said envelope, said container including a liquid capable of developing a visible image in said photosensitive layer, said flap being short enough to prevent further relative movement between said photosensitive layer and said envelope when said photosensitive layer has been drawn into position within said envelope, said connecting member being strong enough and being sufficiently strongly secured to said leader and said envelope so as to draw said assemblage through a processing means to cause the bursting of said container and the release and spreading of said liquid.

7. A film pack comprising a magazine and at least one composite photographic film assemblage thereon, said photographic film assemblage comprising a layer of a photographic photosensitive material, an envelope formed from a material opaque to light which is actinic to said photosensitive layer, said envelope having a first opening at one end thereof, a leader secured to said photosensitive layer and extending into said envelope through said opening, said leader extending the length of said envelope and out of said envelope through a second opening at the other end of said envelope, a pair of flaps secured to that end of said envelope adjacent said second opening, each of said flaps being normally disposed within said envelope and having their ends attached to said leader, said flaps being sufficiently long to permit said leader to draw said photosensitive layer into said envelope and being short enough to prevent further relative movement between said envelope and said photosensitive layer after said photosensitive layer has been drawn into position within said envelope; said magazine including a housing within which at least said photosensitive layer may be held and positioned in exposure position outside of said envelope, and means defining an exposure opening in said housing permitting exposure of the photosensitive layer held thereby.

JOHN GREENHALGH.
NEWELL W. PINKHAM.
ROBERT B. TOMER.

REFERENCES CITED

The following references are of record in the file of this patent:

UNITED STATES PATENTS

| Number | Name | Date |
| --- | --- | --- |
| 1,009,794 | Schneider | Nov. 28, 1911 |
| 1,015,514 | Schuttauf | Jan. 23, 1912 |
| 1,792,295 | Gaseltine | Feb. 10, 1931 |
| 1,994,627 | Von Biehler | Mar. 19, 1935 |
| 2,319,560 | Salfisberg | May 18, 1943 |
| 2,435,720 | Land | Feb. 10, 1948 |